US009152103B2

(12) United States Patent
Ninomiya

(10) Patent No.: US 9,152,103 B2
(45) Date of Patent: Oct. 6, 2015

(54) IMAGE FORMING APPARATUS ENSURING SHORT WARM-UP TIME BY EFFICIENTLY HEATING FIXING UNIT

(71) Applicant: Kyocera Document Solutions Inc., Osaka (JP)

(72) Inventor: Yuichi Ninomiya, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/462,582

(22) Filed: Aug. 19, 2014

(65) Prior Publication Data

US 2015/0049368 A1 Feb. 19, 2015

(30) Foreign Application Priority Data

Aug. 19, 2013 (JP) ................................. 2013-169819

(51) Int. Cl.
*H04N 1/00* (2006.01)
*G03G 15/20* (2006.01)
*G03G 15/00* (2006.01)

(52) U.S. Cl.
CPC ............ *G03G 15/2039* (2013.01); *G03G 15/80* (2013.01)

(58) Field of Classification Search
None
See application file for complete search history.

(56) References Cited

U.S. PATENT DOCUMENTS

2008/0285996 A1* 11/2008 Kinouchi et al. ............... 399/69
2010/0119248 A1* 5/2010 Ishikawa ......................... 399/67
2011/0222889 A1* 9/2011 Tabuchi .......................... 399/69

FOREIGN PATENT DOCUMENTS

JP 2010-022076 A 1/2010

* cited by examiner

*Primary Examiner* — Helen Q Zong
(74) *Attorney, Agent, or Firm* — James W. Judge

(57) ABSTRACT

An image forming apparatus includes a fixing unit, a temperature sensor, a storage unit, a drive-frequency initial setting unit, a power measuring unit, and a drive-frequency adjusting unit. The fixing unit is configured to perform induction heating using a coil unit. The drive-frequency initial setting unit is configured to establish an initial-setting value for a drive frequency of the coil unit based on the temperature-frequency relationship information stored in the storage unit and on the temperature measured by the temperature sensor immediately before a power activation of the fixing unit. The power measuring unit is configured to measure power consumption of the fixing unit at the drive frequency established by the drive-frequency initial setting unit. The drive-frequency adjusting unit is configured to adjust the drive frequency of the coil unit based on the power consumption measured by the power measuring unit.

2 Claims, 6 Drawing Sheets

IMAGE FORMING APPARATUS ENSURING SHORT WARM-UP TIME BY EFFICIENTLY HEATING FIXING UNIT

CROSS-REFERENCE TO RELATED APPLICATION

This application is based upon, and claims the benefit of priority from, corresponding Japanese Patent Application No. 2013-169819 filed in the Japan Patent Office on Aug. 19, 2013, the entire contents of which are incorporated herein by reference.

BACKGROUND

Unless otherwise indicated herein, the description in this section is not prior art to the claims in this application and is not admitted to be prior art by inclusion in this section.

There is provided an image forming apparatus such as a multifunctional peripheral (MFP) that can print a document and an image. In this image forming apparatus, a recording sheet to which a toner image is transferred is heated by a fixing unit to fix the toner so as to perform image formation. As a method for heating this fixing unit, there is a method using induction heating (IH).

Here, as a conventional method of the induction heating, there is known a non-contact power transmission apparatus. The non-contact power transmission apparatus includes an oscillation circuit and performs alternating-current driving of a primary-side winding based on the output of the oscillation circuit to convert the alternate current induced in a secondary-side winding that faces the primary-side winding into a direct current so as to transmit the electric power. In the non-contact power transmission apparatus, the oscillation circuit is constituted by a variable-frequency oscillation circuit with a variable drive frequency, and the input electric power to be supplied from a power supply to the primary-side winding is detected to find the drive frequency at which the input electric power becomes maximum. The oscillation circuit is operated at this drive frequency.

SUMMARY

An image forming apparatus according to the disclosure includes a fixing unit, a temperature sensor, a storage unit, a drive-frequency initial setting unit, a power measuring unit, and a drive-frequency adjusting unit. The fixing unit is configured to perform induction heating using a coil unit. The temperature sensor is configured to measure the temperature of the fixing unit. The storage unit stores temperature-frequency relationship information indicating a relationship between the fixing unit temperature measured by the temperature sensor and a resonant frequency of the coil unit. The drive-frequency initial setting unit is configured to establish an initial-setting value for a drive frequency of the coil unit based on the temperature-frequency relationship information stored in the storage unit and on the temperature measured by the temperature sensor immediately before a power activation of the fixing unit. The power measuring unit is configured to measure power consumption of the fixing unit at the drive frequency established by the drive-frequency initial setting unit. The drive-frequency adjusting unit is configured to adjust the drive frequency of the coil unit based on the power consumption measured by the power measuring unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
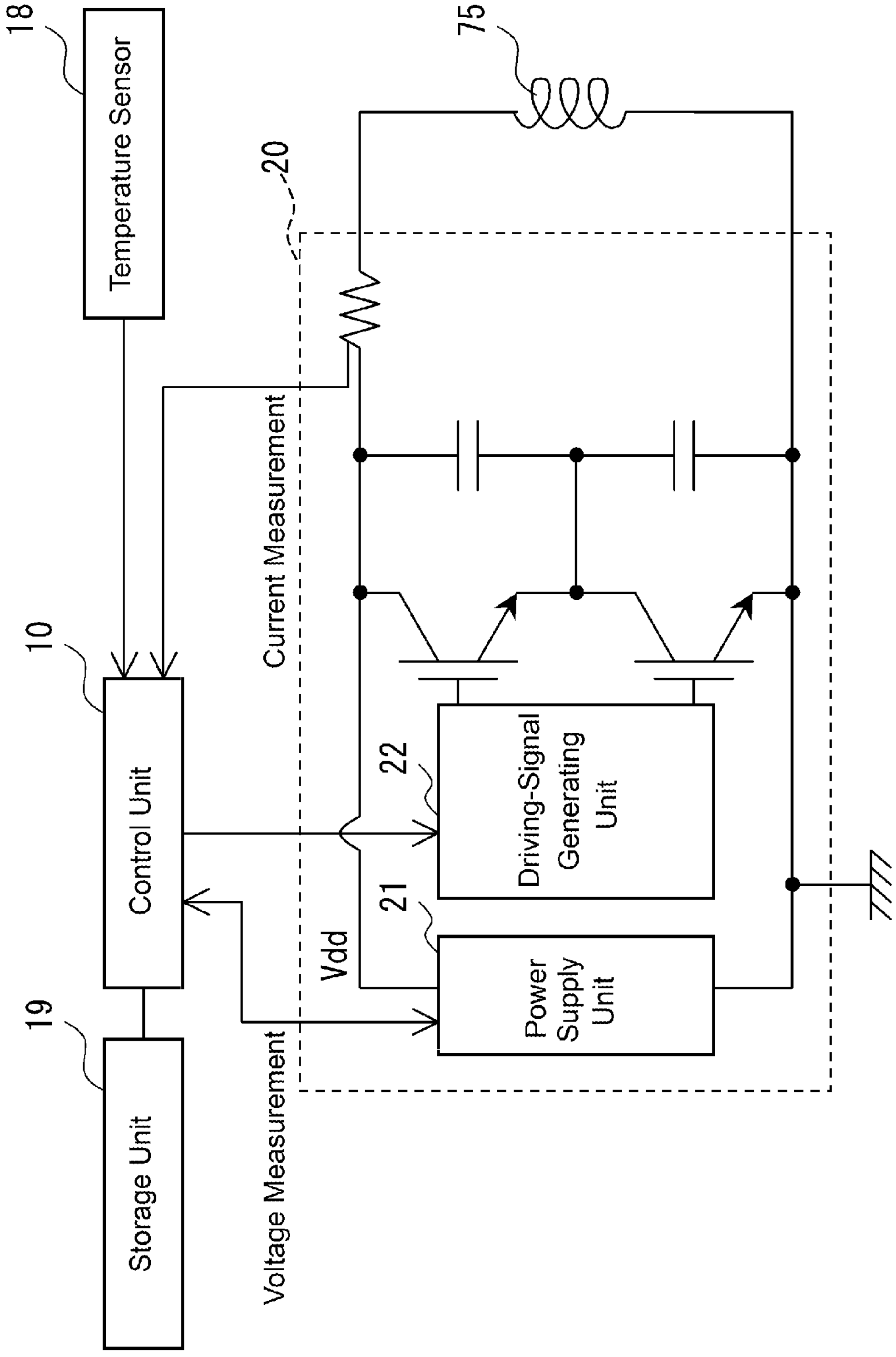
FIG. 1 illustrates a system configuration of a fixing unit in an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 4:
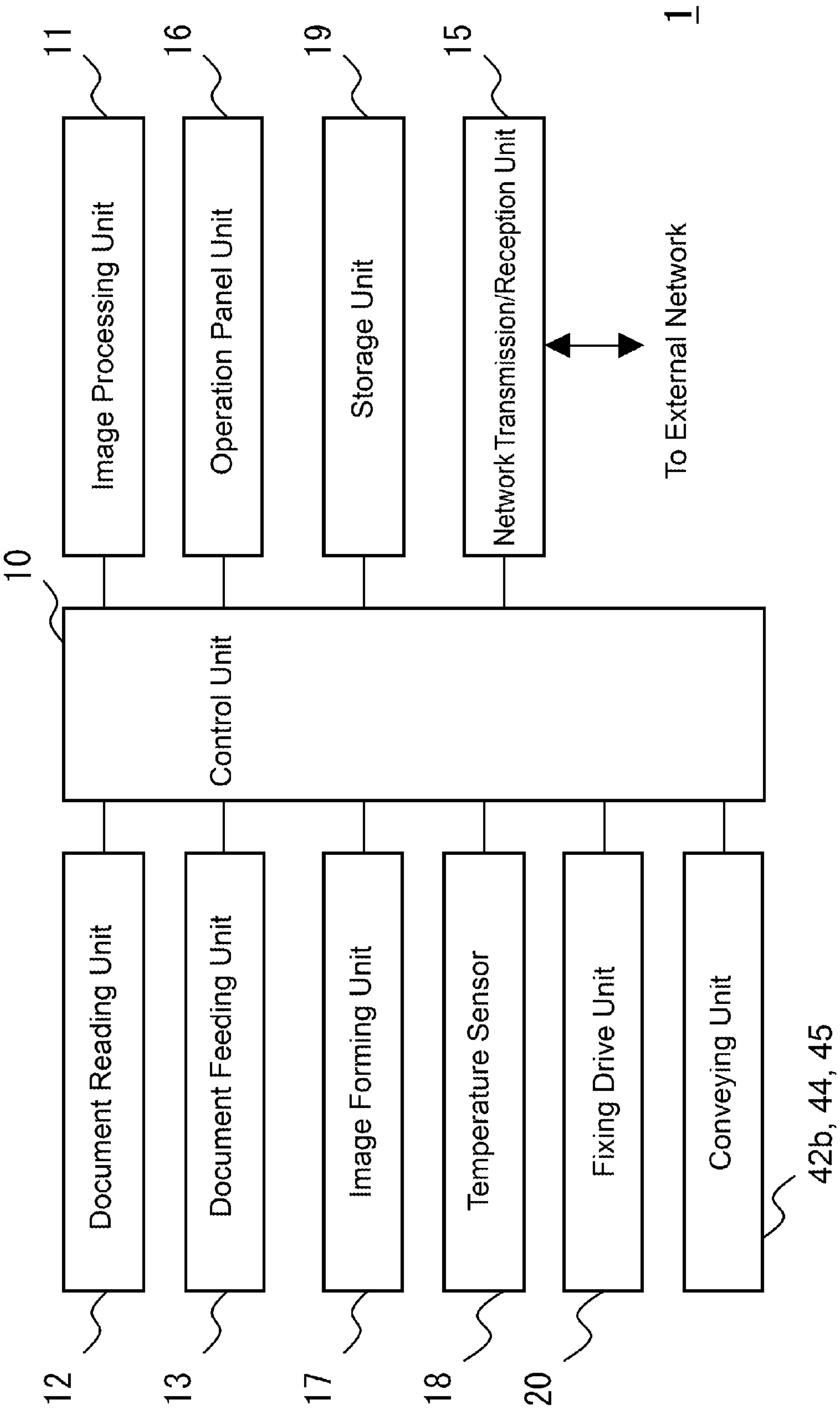
FIG. 4 illustrates the entire configuration of the image forming apparatus according to the one embodiment.

Entire Configuration of Image Forming Apparatus 1 According to One Embodiment Firstly, the entire configuration of an image forming apparatus 1 will be described with reference to FIG. 4. The image forming apparatus 1 includes an image processing unit 11, a document reading unit 12, a document feeding unit 13, a conveying unit (paper feed rollers 42*b*, a conveyance roller pair 44, and a discharge roller pair 45), a network transmission/reception unit 15, an operation panel unit 16, an image forming unit 17, a temperature sensor 18, a storage unit 19, a fixing drive unit 20, and similar member, which are connected to a control unit 10. The control unit 10 performs operation controls of the respective units.

The control unit 10 is an information processing unit such as a general purpose processor (GPP), a central processing unit (CPU), a micro processing unit (MPU), a digital signal processor (DSP), a graphics processing unit (GPU), and an application specific processor (ASIC). The control unit 10 reads a control program stored in a ROM or an HDD of the storage unit 19, expands this control program in the RAM, and executes this control program. This causes the control unit 10 to operate as each unit of function blocks described later. The control unit 10 performs the control of the entire apparatus corresponding to predetermined instruction information that is input from an external terminal (not illustrated) or the operation panel unit 16.

The image processing unit 11 is an operation control unit such as a digital signal processor (DSP) and a graphics processing unit (GPU). The image processing unit 11 performs a predetermined image process on image data. For example, the image processing unit 11 performs various image processes such as scaling, print density adjustment, gradation adjustment, and image improvement. The image processing unit 11 stores the image read by the document reading unit 12 as print data in the storage unit 19. At this time, the image processing unit 11 can also convert the print data into a file unit in a PDF, a TIFF, or a similar format.

The document reading unit 12 reads (scans) a set original document. The document feeding unit 13 conveys the original document to be read by the document reading unit 12. The image forming unit 17 causes image formation on a recording sheet based on the data stored in the storage unit 19, the data read by the document reading unit 12, the data acquired from the external terminal, or similar data. The power delivery to the image forming unit 17 is stopped during a standby state for saving the electric power. Accordingly, the temperature of a fixing unit 17*e* (see FIG. 5) of the image forming unit 17 is unintentionally reduced corresponding to a lapse of time in the standby state or similar parameter. The temperature sensor 18 is a temperature detecting sensor such as a thermistor for measuring the temperature of the fixing unit 17*e*. The conveying unit conveys a recording sheet from a sheet feed cassette 42*a*, and causes image formation on the recording sheet at the image forming unit 17, and then conveys the recording sheet to a stack tray 50. Here, the respective operations of the document reading unit 12, the document feeding unit 13, the conveying unit, the image forming unit 17, the temperature sensor 18, and the fixing drive unit 20 will be described later.

The network transmission/reception unit 15 is a network connection unit that includes a LAN board, a wireless transceiver, and similar member for connecting to an external network such as LAN, wireless LAN, WAN, and a mobile phone network. The network transmission/reception unit 15 transmits and receives data through a data communication line and transmits and receives a voice signal through a voice-grade telephone line.

The operation panel unit 16 includes: a display unit such as an LCD and an input unit including; a numeric keypad; a start key; a cancel key; a button for switching action modes such as copy, FAX transmission, and scanner; a button for issuing an instruction for execution of a job related to printing, transmission, storage, recording or similar operation of a selected document; a touch panel. The operation panel unit 16 acquires the instructions of various jobs of the image forming apparatus 1 from the user. Additionally, the information of each user can be input and changed in accordance with the acquired instruction of the user from the operation panel unit 16.

The storage unit 19 is storage unit that employs a recording medium such as a semiconductor memory such as a read only memory (ROM) and a random access memory (RAM) and a hard disk drive (HDD). The RAM of the storage unit 19 holds the content of the memory by a function such as self-refreshing even during the power-saving state. The ROM and the HDD in the storage unit 19 store control programs for performing the operation control of the image forming apparatus 1. In addition, the storage unit 19 stores account setting of the user. The storage unit 19 may include a region for a storage folder for every user.

In the image forming apparatus 1, the control unit 10 and the image processing unit 11 may be integrally formed like a GPU Built-in CPU or a chip-on-module package. The control unit 10 and the image processing unit 11 may each incorporate a RAM, a ROM, a flash memory, or similar member. The image forming apparatus 1 may include a FAX transmission/reception unit for transmission to and reception from a facsimile.

Operation of Image Forming Apparatus 1

Figure 5:
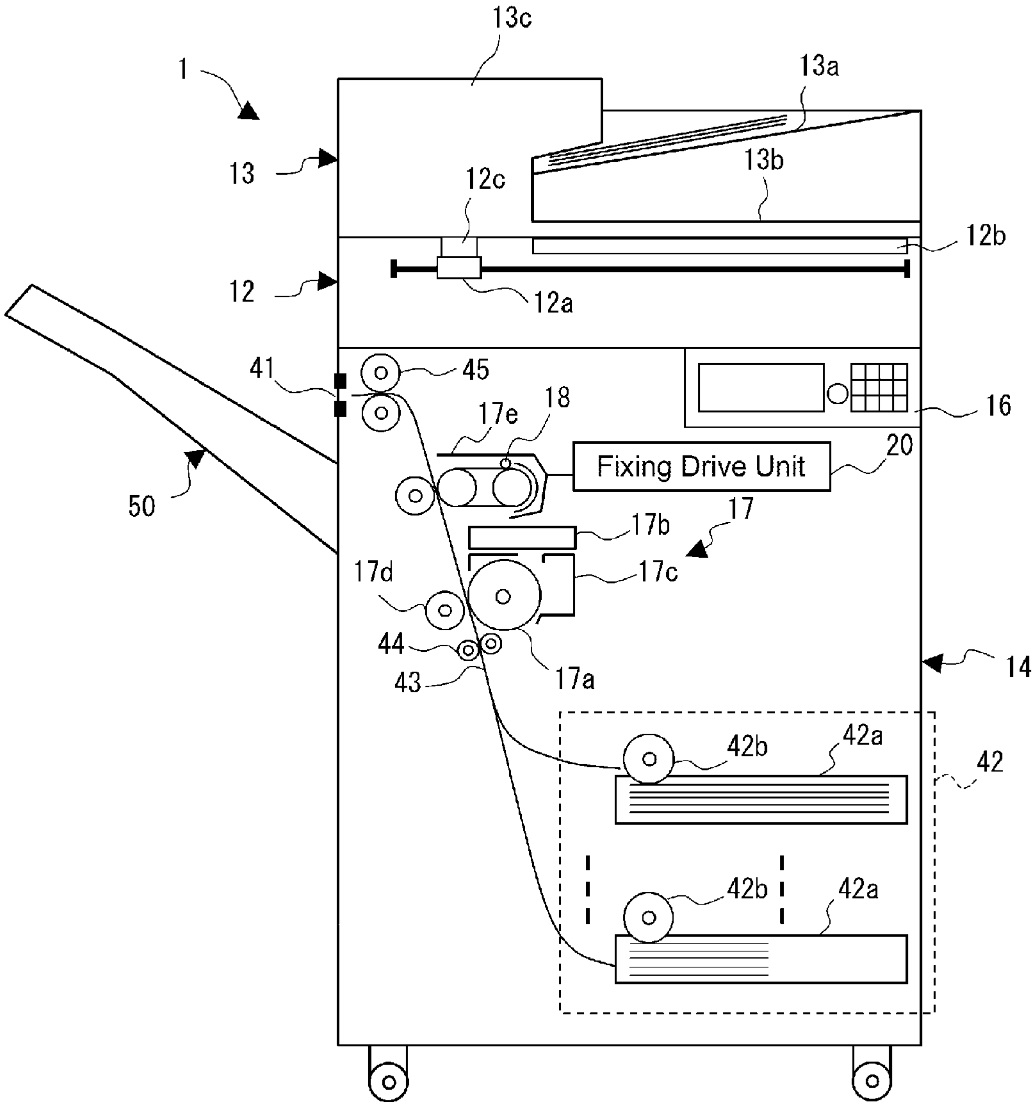
FIG. 5 schematically illustrates the image forming apparatus according to the one embodiment.

Next, a description will be given of the operation of the image forming apparatus 1 according to the embodiment of the disclosure with reference to FIG. 5 and FIG. 6. The document reading unit 12 is arranged on the upper side of a main unit 14. The document feeding unit 13 is arranged on the upper side of the document reading unit 12. The stack tray 50 is arranged on a discharge port 41 side of recording sheets. The discharge port 41 is formed in the main unit 14. The operation panel unit 16 is arranged on the front side of the image forming apparatus 1.

The document reading unit 12 includes a scanner 12*a*, a platen glass 12*b*, and a document reading slit 12*c*. The scanner 12*a* is constituted of an exposing lamp, imaging sensor such as a charge coupled device (CCD), a complementary metal oxide semiconductor (CMOS), and similar member. The scanner 12*a* is capable of moving in the conveyance direction of the original document by the document feeding unit 13. The platen glass 12*b* is a platen constituted of a transparent member such as glass. The document reading slit 12*c* has a slit formed in a direction perpendicular to the conveyance direction of the original document by the document feeding unit 13.

To read the original document placed on the platen glass 12*b*, the scanner 12*a* is moved to the position facing the platen glass 12*b*. Subsequently, the scanner 12*a* acquires image data by reading the original document while scanning the original document placed on the platen glass 12*b*, so as to output the acquired image data to the main unit 14. To read the original document conveyed by the document feeding unit 13, the scanner 12*a* is moved to the position facing the document reading slit 12*c*. Subsequently, the scanner 12*a* acquires image data by reading the original document via the document reading slit 12*c* in synchronization with the conveying operation of the original document by the document feeding unit 13, so as to output the acquired image data to the main unit 14.

The document feeding unit 13 includes a document placement unit 13*a*, a document discharging unit 13*b*, and a document conveying mechanism 13*c*. The original document placed on the document placement unit 13*a* is sequentially fed one by one by the document conveying mechanism 13*c*, conveyed to the position facing the document reading slit 12*c*, and then discharged to the document discharging unit 13*b*. Here, the document feeding unit 13 is constituted to be retractable. Lifting up the document feeding unit 13 ensures opening the top surface of the platen glass 12*b*.

The main unit 14 includes the image forming unit 17, and also includes a paper sheet feeder 42, a paper sheet conveyance passage 43, the conveyance roller pair 44, and the discharge roller pair 45. The paper sheet feeder 42 includes a plurality of sheet feed cassettes 42*a* and a plurality of paper feed rollers 42*b*. The sheet feed cassettes 42*a* store respective recording sheets having different sizes or orientations. The paper feed roller 42*b* feeds the recording sheet one by one to the paper sheet conveyance passage 43 from the sheet feed cassette 42*a*. The paper feed roller 42*b*, the conveyance roller pair 44, and the discharge roller pair 45 function as the conveying unit. The recording sheet, which is fed to the paper sheet conveyance passage 43 by the paper feed roller 42*b*, is conveyed toward the image forming unit 17 by the conveyance roller pair 44. The conveyed recording sheet undergoes positioning and adjustment of a margin width at the distal end of the paper sheet at predetermined timing, and then is conveyed to the inside of the image forming unit 17. The recording sheet that has been conveyed to the inside of the image forming unit 17 and undergone recording is discharged to the stack tray 50 by the discharge roller pair 45.

The image forming unit 17 includes a photoreceptor drum 17*a*, an exposing unit 17*b*, a developing unit 17*c*, a transfer unit 17*d*, and the fixing unit 17*e*. The exposing unit 17*b* is an optical unit that includes a laser device, a mirror, and a lens, and similar member. The exposing unit 17*b* outputs a light or similar radiation based on the image data to expose the photoreceptor drum 17*a*, so as to form an electrostatic latent image on the surface of the photoreceptor drum 17*a*. The developing unit 17*c* is a developer unit that develops the electrostatic latent image formed on the photoreceptor drum 17*a* using a toner. The developing unit 17*c* forms a toner image based on the electrostatic latent image on the photoreceptor drum 17*a*. The transfer unit 17*d* transfers the toner image formed on the photoreceptor drum 17*a* by the developing unit 17*c* to the recording sheet. The fixing unit 17*e* heats the recording sheet to which the toner image is transferred by the transfer unit 17*d* so as to fix the toner image to the recording sheet.

Figure 6:
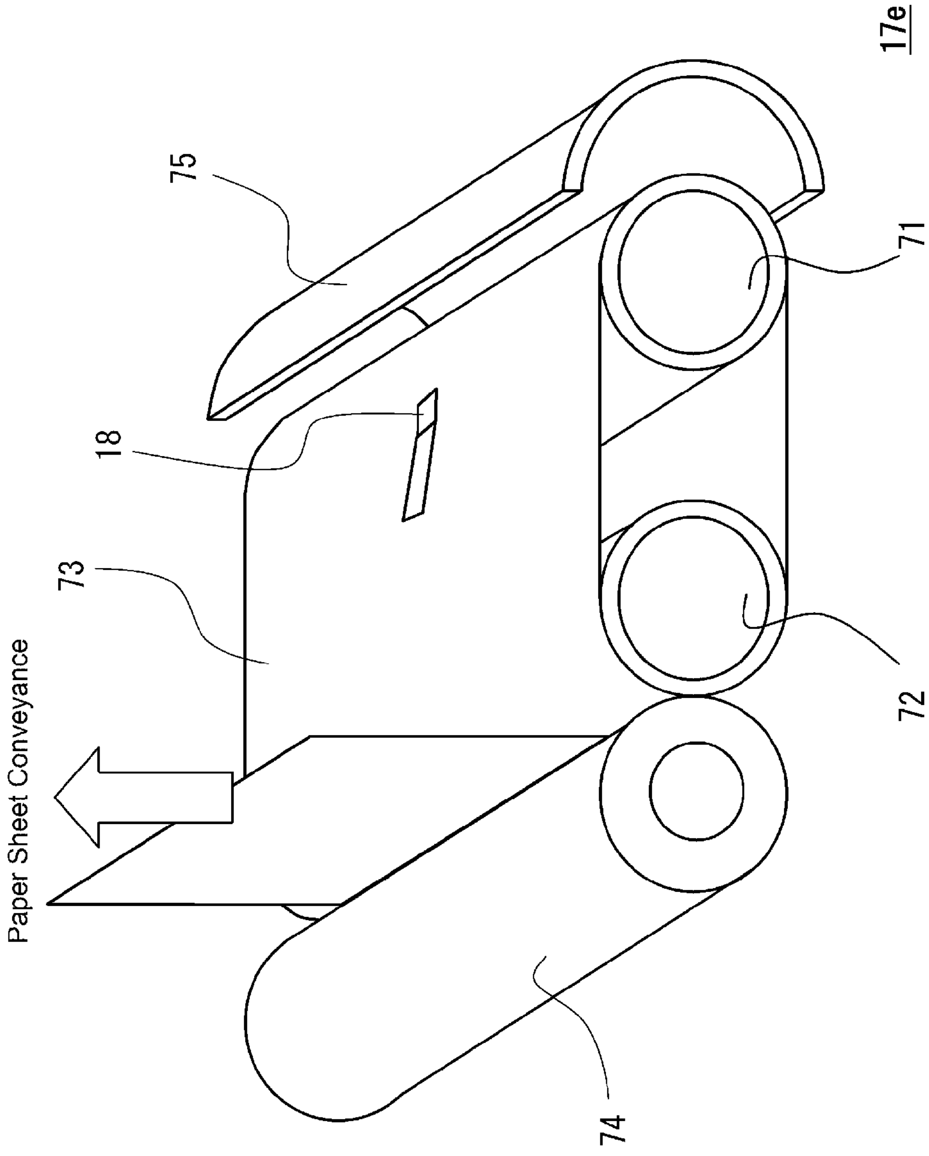
FIG. 6 perspectively illustrates the fixing unit and a temperature sensor according to the one embodiment.

With reference to FIG. 6, the fixing unit 17*e* includes, for example, a heating roller 71, a melting roller 72, a heating belt 73, a pressure roller 74, and a coil unit 75. The heating belt 73 is a belt for fixing the toner onto the recording sheet, and is suspended between the heating roller 71 and the melting roller 72. The pressure roller 74 is a roller for pressing the paper sheet against the heating belt 73, and is arranged to have the outer peripheral surface in contact with the heating belt 73. The coil unit 75 is arranged in the peripheral area of the heating roller 71 at a distance from the heating roller 71.

For example, the heating roller 71 includes an iron cored bar roller in a cylindrical shape and a release layer (such as a PFA layer). The release layer is formed on the outer peripheral surface of the iron coredbar roller, and has a thickness dimension equal to or more than 0.2 mm and equal to or less than 1.0 mm. The heating roller 71 is formed in a cylindrical shape with an outer diameter of 30 mm.

For example, the melting roller 72 is formed in a cylindrical shape, and includes a cored bar roller and a sponge layer. The cored bar roller is formed of stainless steel and has an outer diameter of 45 mm. The sponge layer is formed of a silicone rubber that has a thickness equal to or more than 5 mm and equal to or less than 10 mm, and covers the outer peripheral surface of the cored bar roller.

For example, the heating belt 73 includes an electroformed nickel substrate, a silicone rubber layer, and a release layer (such as a PFA layer). The electroformed nickel substrate has a thickness dimension equal to or more than about 30 μm and equal to or less than about 50 μm. The silicone rubber layer is laminated on the electroformed nickel substrate. The release layer is formed on the silicone rubber layer. The heating belt 73 is formed of a material with a high thermal conductivity so as to be appropriate for heating.

For example, the pressure roller 74 includes a cored bar roller formed of stainless steel, a sponge layer, and a release layer (such as a PFA layer). The sponge layer is formed of a silicone rubber that has a thickness equal to or more than 2 mm and equal to or less than 5 mm, and covers the outer peripheral surface of the cored bar roller. The pressure roller 74 is formed in a cylindrical shape with an outer diameter of 50 mm. The cored bar roller of the pressure roller 74 may be formed using, for example, Fe or Al. On this core material, a silicone rubber layer may be formed. Further, a fluororesin layer may be formed on the superficial layer of the silicone rubber layer.

The coil unit 75 is an exciting coil unit for performing induction heating by electromagnetic induction. When a high-frequency wave is applied from the fixing drive unit 20 to the coil unit 75, free electrons within the metal of the heating roller 71 and the heating belt 73 move due to a change of magnetic flux and then heat generation occurs, in the heating roller 71 and the heating belt 73, due to resistive loss. This coil unit 75 may be provided by dividing the exciting coil into a plurality of pieces.

The temperature sensor 18 is a sensor such as a thermistor that detects the temperatures of the heating roller 71, the heating belt 73, and similar member so as to measure the temperature of the fixing unit 17*e*. For example, the temperature sensor 18 is supported by a leaf spring or similar member to have a range of motion of about several mm, and is pressed against the outer peripheral surface of the heating belt 73. The temperature sensor 18 detects the change in electrical resistance or similar change corresponding to the temperatures of the heating roller 71 and the heating belt 73. The signal representing temperature detected by the temperature sensor 18 undergoes A/D conversion or similar process, and then is measured as the temperature of the fixing unit 17*e*. Here, a plurality of the temperature sensors 18 may be provided to more accurately calculate the temperatures of the heating roller 71 and the heating belt 73.

Configuration of Control System for Fixing Unit 17*e* of Image Forming Apparatus 1

A description will be given of the configuration of a control system for the fixing unit 17*e* of the image forming apparatus 1 illustrated in FIG. 5 above with reference to FIG. 1. With reference to FIG. 1, the control system for the fixing unit 17*e* includes the control unit 10, the storage unit 19, the temperature sensor 18, the fixing drive unit 20, and the coil unit 75. The control unit 10 refers to the storage unit 19 based on the temperatures of the heating roller 71 and the heating belt 73 (see FIG. 6) measured by the temperature sensor 18, to set a drive frequency to a driving-signal generating unit 22 of the fixing drive unit 20. The control unit 10 refers to the information stored in the storage unit 19 based on the electric power calculated from the current that has flowed through the coil unit 75, to control the driving-signal generating unit 22 so as to adjust the drive frequency. The storage unit 19 stores, for example, a table showing the relationship between a temperature detected using the temperature sensor 18 and a resonant frequency of the coil unit 75 as a factory default. The fixing drive unit 20 is a high-frequency power supply circuit or similar circuit for applying a high-frequency wave to the coil unit 75. The fixing drive unit 20 supplies the driving signal generated by the driving-signal generating unit 22 to two high-frequency switching transistors or similar member connected in series to the power supply voltage applied from a power supply unit 21, so as to alternately drive the respective switching transistors, thus causing a flow of a high-frequency current through the coil unit 75. The coil unit 75 receives a flow of a high-frequency current at the drive frequency set by a drive-frequency adjusting unit 120 (see FIG. 2) of the fixing drive unit 20. This causes a high-frequency magnetic flux in the coil unit 75 and then causes eddy currents in the heating roller 71 and the heating belt 73, thus heating these members by Joule heat. The power supply unit 21 is a stabilized power supply in which an alternating-current voltage (AC) is rectified to be converted into a DC voltage or similar power supply. The driving-signal generating unit 22 uses a voltage-controlled oscillation circuit in which the oscillation frequency can be changed corresponding to a control voltage supplied from the control unit 10 or similar circuit to generate and output a driving signal for the high-frequency transistors or similar member.

Configuration of Control Unit 10 of Image Forming Apparatus 1

Figure 2:
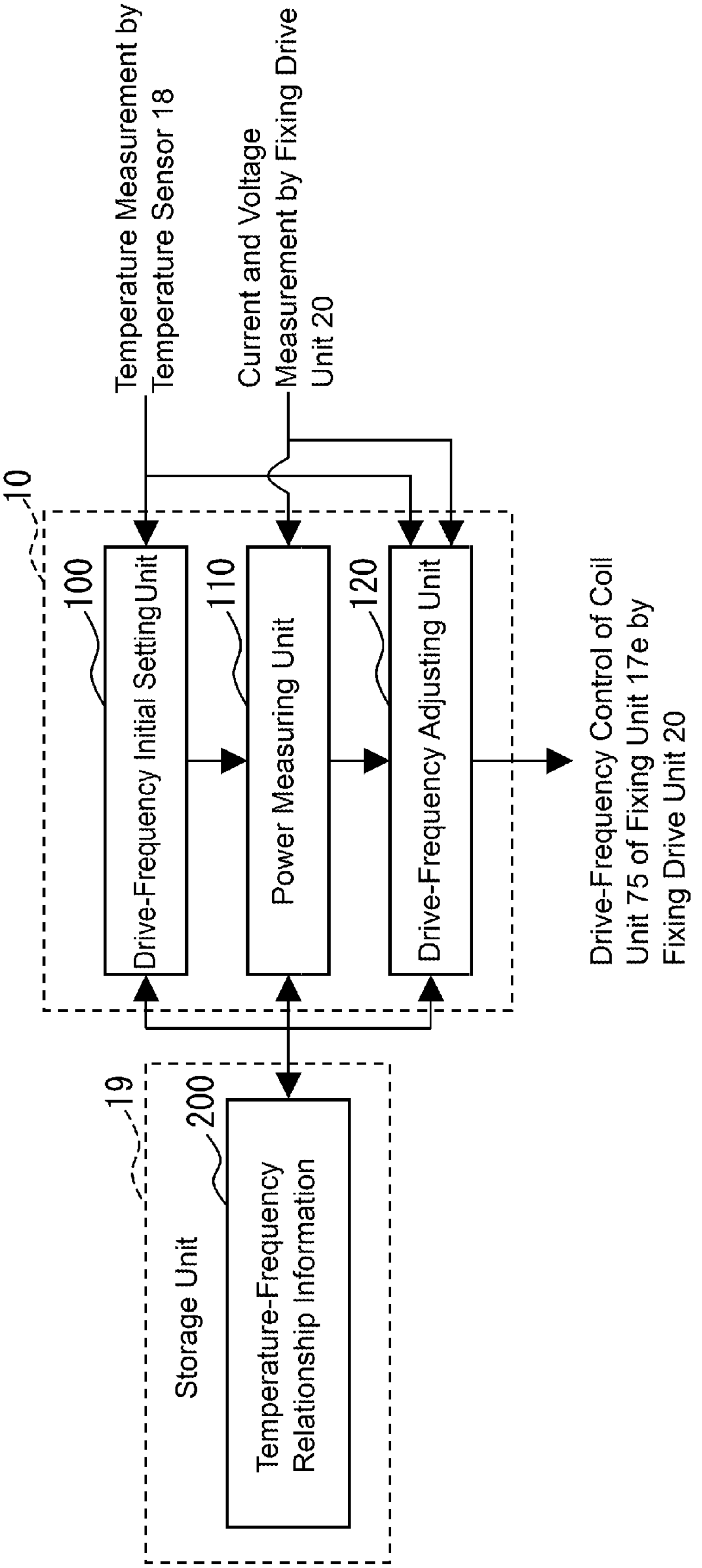
FIG. 2 illustrates a functional configuration of the image forming apparatus according to the one embodiment.

A description will be given of the detailed configuration of the control unit 10 of the image forming apparatus 1 illustrated in FIG. 1 with reference to FIG. 2. The control unit 10 includes a drive-frequency initial setting unit 100, a power measuring unit 110, and the drive-frequency adjusting unit 120. The storage unit 19 stores temperature-frequency relationship information 200.

The drive-frequency initial setting unit 100 establishes an initial-setting value for the drive frequency of the coil unit 75 based on the temperature-frequency relationship information 200 stored in the storage unit 19 and the temperature measured by the temperature sensor 18 immediately before the power activation of the coil unit 75 of the fixing unit 17*e*. That is, the drive-frequency initial setting unit 100 appropriately establishes the initial value for the drive frequency based on the temperature-frequency relationship information 200 stored in the storage unit 19 immediately before the electric power is output.

The power measuring unit 110 measures the power consumption of the fixing unit 17*e* at the drive frequency set by the drive-frequency initial setting unit 100. The power measuring unit 110 calculates a power value based on a product of the voltage of the power supply unit 21 in the fixing drive unit 20 (see FIG. 1) and a measured current.

The drive-frequency adjusting unit 120 adjusts the drive frequency of the coil unit 75 in the fixing unit 17*e* based on the electric power measured by the power measuring unit 110. Additionally, the drive-frequency adjusting unit 120 reduces the established drive frequency by a predetermined amount, causes the power measuring unit 110 to measure the electric powers before and after the reduction in order to calculate a gradient, calculates a point immediately before the gradient is reduced and becomes negative, that is, a point at which the output power becomes local maximum as a resonant frequency, and adjusts the drive frequency to the calculated resonant frequency. The drive-frequency adjusting unit 120 adjusts the drive frequency during power activation or during recovery from the power-saving state. The drive-frequency adjusting unit 120 repeats the calculation of the resonant frequency at warm-up time during power activation or during recovery from the power-saving state such as a sleep mode.

The temperature-frequency relationship information 200 is the information indicative of the relationship between the temperature measured by the temperature sensor 18 and the resonant frequency of the coil unit 75 in the fixing unit 17*e*. The temperature-frequency relationship information 200 is, for example, a table describing a resonant frequency corresponding to a temperature in a predetermined range. The drive-frequency initial setting unit 100 can read out the resonant frequency corresponding to the temperature measured by the temperature sensor 18 from the temperature-frequency relationship information 200 so as to set the drive frequency. The relationship between the temperature information of the fixing unit 17*e* and the resonant frequency may be actually measured when the coil unit 75 is mounted on the image forming apparatus 1, and temperature-frequency relationship information 200 may be stored in the storage unit 19. Additionally, the storage unit 19 may store the actual value of the resonant frequency set based on the value of the temperature sensor 18 by the following drive-frequency setting process in real time (actual time), so as to consider aged deterioration or similar factor.

Here, the control unit 10 of the image forming apparatus 1 may execute the control program stored in the storage unit 19 to function the drive-frequency initial setting unit 100, the power measuring unit 110, and the drive-frequency adjusting unit 120 or may achieve these functions using a dedicated circuit. The respective units of the above-described image forming apparatus 1 are hardware resources for performing an image forming method of the disclosure.

Drive-Frequency Setting Process by Image Forming Apparatus 1

Figure 3:
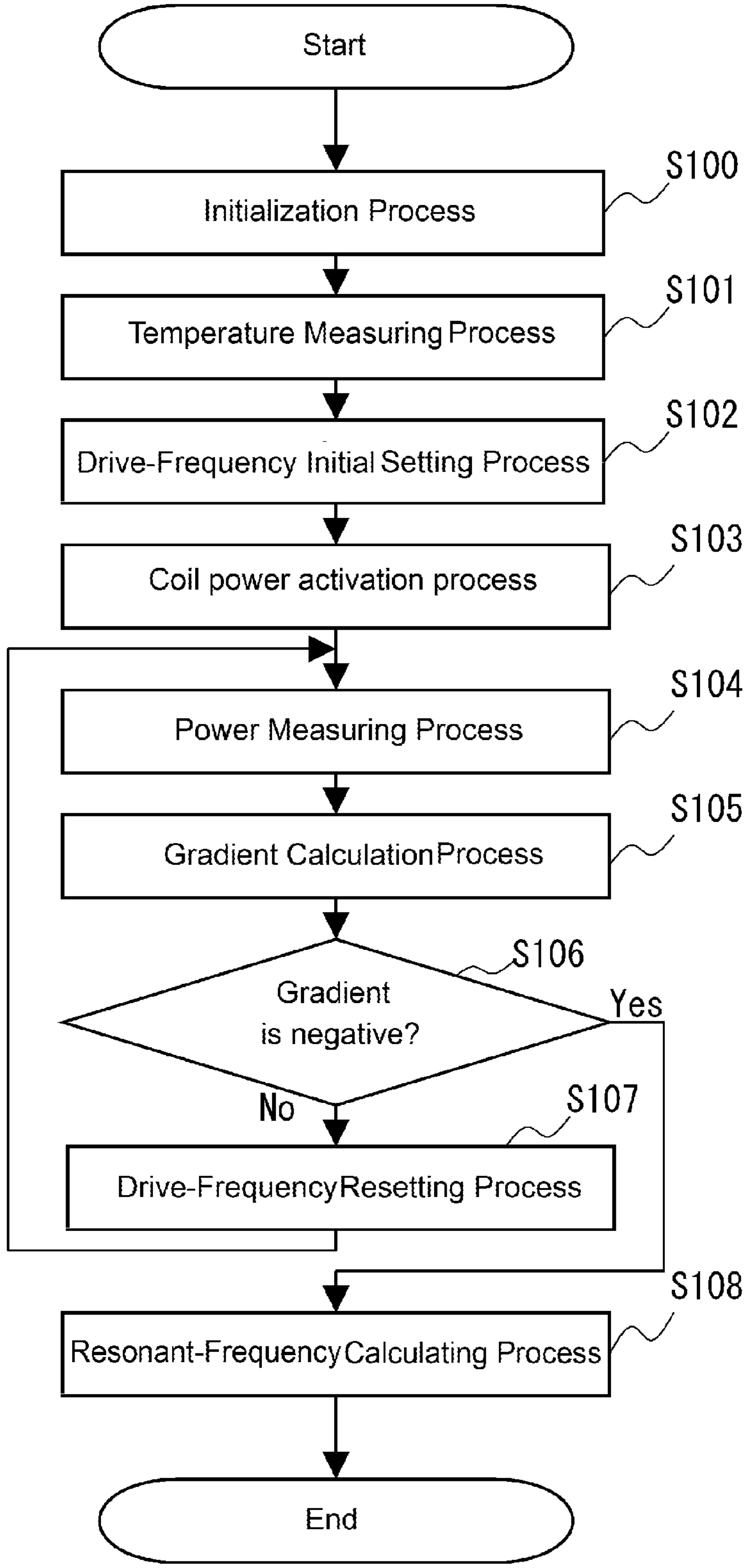
FIG. 3 illustrates a drive-frequency setting process according to the one embodiment.

Next, a description will be given of the drive-frequency setting process by the image forming apparatus 1 according to the one embodiment of the disclosure with reference to FIG. 3. The drive-frequency setting process in this embodiment measures the current temperature by the temperature sensor 18, refers to the temperature-frequency relationship information 200 showing the relationship between the temperature and the resonant frequency, and applies a high-frequency voltage at the drive frequency corresponding to the resonant frequency, so as to quickly heat the heating roller 71 and the heating belt 73. At this time, the power value of the electric power supplied for heating the heating roller 71 and the heating belt 73 is monitored to be fed back to the control unit 10 for adjustment. This results in heating with the maximum electric power. In the drive-frequency setting process in this embodiment, the control unit 10 mainly executes the program stored in the storage unit 19 using the hardware resources in collaboration with the respective units. The following describes the detail of the drive-frequency setting process for each step with reference to a flow chart in FIG. 3.

Step S100

Firstly, the control unit 10 causes the drive-frequency initial setting unit 100 to perform an initialization process. The control unit 10 initializes the respective units for operation check during power activation or during recovery from the power-saving state due to the operation of the user through the operation panel unit 16, the reception of job data from a terminal (not illustrated), or similar reason.

Step S101

Subsequently, the control unit 10 causes the drive-frequency initial setting unit 100 to perform a temperature measuring process. The control unit 10 acquires the temperature of the fixing unit 17*e* measured by the temperature sensor 18 immediately before the power activation of the coil unit 75 of the fixing unit 17*e*. This temperature varies depending on the elapsed time after the last image formation is performed by the image forming unit 17.

Step S102

Subsequently, the control unit 10 causes the drive-frequency initial setting unit 100 to perform a drive-frequency initial setting process. The control unit 10 reads out the temperature-frequency relationship information 200 from the storage unit 19. The control unit 10 acquires the value of the resonant frequency of the coil unit 75 corresponding to the temperature of the fixing unit 17*e* measured by the temperature sensor 18 from the temperature-frequency relationship information 200. This value is set to the initial-setting value for the drive frequency of the coil unit 75. The control unit 10 establishes the acquired initial-setting value for the drive frequency for the driving-signal generating unit 22 of the fixing drive unit 20. That is, the control unit 10 establishes the initial-setting value of the drive frequency based on the temperature of the fixing unit 17*e* immediately before the high-frequency power supply circuit (the fixing drive unit 20) starts to output electric power.

Step S103

Subsequently, the control unit 10 causes the drive-frequency initial setting unit 100 to perform a coil power activation process. The control unit 10 turns on the power supply unit 21 (see FIG. 1) of the fixing drive unit 20 to generate a DC voltage at a predetermined voltage level. Thus, the high-frequency voltage at the established drive frequency is applied to the coil unit 75.

Step S104

Here, the control unit 10 causes the power measuring unit 110 to perform a power measuring process. The control unit 10 measures the electric power consumed by the fixing drive unit 20. The control unit 10 performs a calculation of a product of the voltage of the power supply unit 21 (see FIG. 1) and a measured current or similar operation to calculate the power value, so as to measure the power consumption.

Step S105

Subsequently, the control unit 10 causes the drive-frequency adjusting unit 120 to perform a gradient calculation process. When the power value has been previously measured, the control unit 10 performs a subtraction between this previously measured power value and the power value during power activation at the established drive frequency or similar operation to calculate the gradient. That is, for the drive frequency to be output, the control unit 10 reestablishes the setting value that is set by reducing the setting value based on the temperature of the fixing unit 17*e* by a predetermined amount as described later, and calculates an increasing rate of the power value measured before and after the resetting or similar value as the gradient. Here, the control unit 10 does not calculate the gradient when only power value measured at the time of setting the initial-setting value has been calculated.

Step S106

Subsequently, the control unit 10 causes the drive-frequency adjusting unit 120 to determine whether or not the gradient is negative. The control unit 10 makes a determination of "Yes" when the gradient is calculated and the calculated gradient is negative, that is, the power value is reduced. Otherwise, the control unit 10 makes a determination of "No." In the case of "Yes," the control unit 10 causes the process to proceed to Step S108. In the case of "No," the control unit 10 causes the process to proceed to Step S107.

Step S107

When the calculated gradient is not negative, the control unit 10 causes the drive-frequency adjusting unit 120 to perform a drive-frequency resetting process. The control unit 10 reduces the set drive frequency by a predetermined amount so as to reset the drive frequency to the driving-signal generating unit 22 of the fixing drive unit 20. This predetermined amount may be set based on information such as the variation in resonant frequency of the coil unit 75 and the accuracy of the driving-signal generating unit 22. Subsequently, the control unit 10 returns the process to Step S104.

Step S108

When the calculated gradient is negative, the control unit 10 causes the drive-frequency adjusting unit 120 to perform a resonant-frequency calculating process. The control unit 10 calculates the drive frequency immediately before the calculated gradient becomes negative, that is, when the output power becomes local maximum, as a resonant frequency. The control unit 10 reestablishes the drive frequency of the driving-signal generating unit 22 in the fixing drive unit 20 to this resonant frequency. The control unit 10 may repeat the respective processes in the above-described drive-frequency setting process at warm-up time at the power activation of the image forming unit 17 or during recovery from the power-saving state. Then, the drive-frequency setting process according to the embodiment of the disclosure is terminated.

With the configuration as described above, the following effects can be obtained. A conventional technique for charging a mobile electronic device has not been able to adjust the drive frequency at high speed. In contrast, the image forming apparatus 1 according to the embodiment of the disclosure includes the fixing unit 17*e* that performs induction heating on the heating roller 71 and the heating belt 73 using the coil unit 75 having a coil. The image forming apparatus 1 includes the temperature sensor 18, the storage unit 19, the drive-frequency initial setting unit 100, the power measuring unit 110, and the drive-frequency adjusting unit 120. The temperature sensor 18 mainly detects the temperatures of the heating roller 71 and the heating belt 73 to measure the temperature of the fixing unit 17*e*. The storage unit 19 stores the temperature-frequency relationship information 200 showing the relationship between the temperature of the fixing unit 17*e* measured by the temperature sensor 18 and the resonant frequency of the coil unit 75. The drive-frequency initial setting unit 100 establishes the initial-setting value for the drive frequency of the coil unit 75 based on the temperature-frequency relationship information 200 stored in the storage unit 19 and the temperature measured by the temperature sensor 18 at the power activation of the fixing unit 17*e*. The power measuring unit 110 measures the power consumption of the fixing unit 17*e* at the drive frequency set by the drive-frequency initial setting unit 100. The drive-frequency adjusting unit 120 adjusts the drive frequency of the coil unit 75 based on the electric power measured by the power measuring unit 110.

With this configuration, using the temperature-frequency relationship information 200, which is the relationship between the temperature of the fixing unit 17*e* and the resonant frequency, ensures quickly searching the appropriate resonant frequency so as to find out the resonant frequency at higher speed and set the resonant frequency. The fixing drive unit 20 for the fixing unit 17*e* can output a high-frequency wave at this resonant frequency, supply the appropriate electric power to the coil unit 75, and quickly heat the heating roller 71 and the heating belt 73. That is, the maximum output power, which is set by the high-frequency power supply circuit of the fixing drive unit 20, can be supplied for heating the heating roller 71 and the heating belt 73. Thus, the warm-up after power activation of the image forming apparatus 1 and the recovery from the power-saving state are completed in the shortest time. This ensures reduction in waiting time required for warm-up and the recovery so as to improve the convenience for the user.

In the image forming apparatus 1 according to the embodiment of the disclosure, the drive-frequency adjusting unit 120 reduces the drive frequency from the setting value by a predetermined amount, causes the power measuring unit 110 to measure the electric powers before and after the reduction so as to calculate a gradient, calculates the drive frequency immediately before the gradient is reduced and becomes negative as a resonant frequency, and adjusts the drive frequency to the calculated resonant frequency. This configuration can facilitate changing the drive frequency from the initial-setting value set by the drive-frequency initial setting unit 100 to the appropriate resonant frequency in a short time.

In the image forming apparatus 1 according to the embodiment of the disclosure, the drive-frequency adjusting unit 120 adjusts the drive frequency during power activation or during recovery from the power-saving state. Accordingly, adjusting the drive frequency during power activation or during recovery from the power-saving state at high speed ensures efficient heating of the fixing unit 17*e* so as to ensure the shortest warm-up time during power activation and/or the shortest recovery time from the power-saving state.

Additionally, compared with conventional electric power supply to a mobile electronic device, conventional heating of a pan using IH, or similar method, the image forming apparatus 1 in which the components are secured have a smaller variation range of the load side. That is, in the image forming apparatus 1 that includes the fixing unit 17*e* using IH, the coil unit 75 on the load side is secured by screw or similar method. Thus, impedance change due to a positional shift does not occur. Additionally, component variation does not occur unless the coil unit 75 is replaced due to failure or similar reason.

Accordingly, the image forming apparatus 1 of this embodiment can store the impedance change on the load side due to component variation of the coil unit 75 and variation in inside temperature of the image forming apparatus 1 as the temperature-frequency relationship information 200 in the storage unit 19 at the time of assembly or similar time. Thus, the image forming apparatus 1 can narrow down the adjustment range of the drive frequency so as to quickly set the resonant frequency. That is, this temperature-frequency relationship information 200 can compensate variation in impedance of the resonance coil and the resonance capacitor due to component variation and non-linear variation in impedance due to the difference in inside temperature of the image forming apparatus 1, so as to quickly heat the heating roller 71 and the heating belt 73 with the maximum electric power. The fixing drive unit 20 can always supply the coil with the maximum electric power to be set by the high-frequency power supply circuit. This ensures shortening the warm-up time and the recovery time from the power-saving state.

Other Embodiments

In the embodiment of the disclosure, it has been described the configuration in which the resonant frequency is calculated by reducing the drive frequency from the initial frequency by the predetermined amount. However, the appropriate resonant frequency may be calculated such that the control unit 10 increases the drive frequency by a predetermined amount or repeats reducing and increasing the drive frequency by a predetermined amount. Furthermore, the predetermined amount may be set to be variable and reduced each time the drive-frequency resetting process described above is done so as to converge to the optimal value. Additionally, since the inside temperature is increased after the electric power is supplied, the control unit 10 may change the drive frequency taking into consideration this increasing rate. With this configuration, the drive frequency can be set to a more appropriate value so as to efficiently supply electric power.

The above-described embodiment has been described such that the coil unit 75 heats the heating roller 71 and the heating belt 73. However, as a possible configuration, the heating belt 73 may be formed of metal without magnetism such as copper, resin, or similar material while the heating roller 71 is mainly heated. Additionally, as a possible configuration, the heating roller 71 and the melting roller 72 may be integrally constituted. In this case, the coil unit 75 may directly heat the integrally constituted roller. That is, a configuration without using the heating belt 73 is possible. This configuration saves the cost while the process in the above-described embodiment is used as it is.

The disclosure is also applicable to an information processing apparatus other than the image forming apparatus. That is, a possible configuration employs a network scanner, a server to which a scanner is additionally connected via USB or similar interface, and similar device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:

a fixing unit configured to perform induction heating using a coil unit;

a temperature sensor configured to measure a temperature of the fixing unit;

a storage unit storing temperature-frequency relationship information indicating a relationship between the fixing unit temperature measured by the temperature sensor and a resonant frequency of the coil unit;

a drive-frequency initial setting unit configured to establish an initial-setting value for a drive frequency of the coil unit based on the temperature-frequency relationship information stored in the storage unit, and on the temperature measured by the temperature sensor immediately before a power activation of the fixing unit;

a power measuring unit configured to measure power consumption of the fixing unit at the drive frequency established by the drive-frequency initial setting unit; and a drive-frequency adjusting unit configured to adjust the drive frequency of the coil unit based on the power consumption measured by the power measuring unit, reduce the established drive frequency of the coil unit by a predetermined amount, cause the power measuring unit to measure power consumption of the fixing unit before and after the reduction so as to calculate a gradient from the before and after measurements, calculate, as a resonant frequency, a drive frequency for immediately preceding where the gradient lessens and goes negative, and adjust the drive frequency of the coil unit to the calculated resonant frequency.

2. The image forming apparatus according to claim 1, wherein the drive-frequency adjusting unit is configured to adjust the drive frequency of the coil unit during power activation or during recovery from a power-saving state.

* * * * *